US012008931B2

(12) United States Patent
He

(10) Patent No.: US 12,008,931 B2
(45) Date of Patent: Jun. 11, 2024

(54) COMPENSATION METHOD AND COMPENSATION DEVICE OF DISPLAY PANEL

(71) Applicants: Huizhou China Star Optoelectronics Display Co., Ltd., Huizhou (CN); Shenzhen China Star Optoelectronics Semiconductor Display Technology Co., Ltd., Shenzhen (CN)

(72) Inventor: Wei He, Huizhou (CN)

(73) Assignees: HUIZHOU CHINA STAR OPTOELECTRONICS DISPLAY CO., LTD., Huizhou (CN); SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/620,870

(22) PCT Filed: Dec. 10, 2021

(86) PCT No.: PCT/CN2021/137086

§ 371 (c)(1),
(2) Date: Dec. 20, 2021

(87) PCT Pub. No.: WO2023/092694

PCT Pub. Date: Jun. 1, 2023

(65) Prior Publication Data

US 2024/0029601 A1 Jan. 25, 2024

(30) Foreign Application Priority Data

Nov. 24, 2021 (CN) ........................ 202111404299.3

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0452* (2013.01);
(Continued)

(58) Field of Classification Search
CPC ................. G09G 3/006; G09G 3/3233; G09G 2300/0452; G09G 2300/0842;
(Continued)

(56) References Cited

U.S. PATENT DOCUMENTS

2004/0032516 A1 2/2004 Kakarala
2007/0109327 A1* 5/2007 Cok ..................... G09G 3/2003
345/690

(Continued)

FOREIGN PATENT DOCUMENTS

CN 101017262 A 8/2007
CN 101571629 A 11/2009

(Continued)

*Primary Examiner* — Richard J Hong
(74) *Attorney, Agent, or Firm* — PV IP PC; Wei Te Chung; Zhigang Ma

(57) ABSTRACT

A compensation method of a display panel is provided and comprises: acquiring position information of a first sub-pixel; acquiring position information of a second sub-pixel located in the same pixel unit as the first sub-pixel when the position information of the first sub-pixel matches position information of an abnormal sub-pixel; acquiring position information of a third sub-pixel that is adjacent to the second sub-pixel and emits light of the same color; finally, setting a compensation parameter of the third sub-pixel as a compensation parameter of the second sub-pixel.

20 Claims, 3 Drawing Sheets

(52) U.S. Cl.
CPC ............... *G09G 2300/0842* (2013.01); *G09G 2320/0233* (2013.01); *G09G 2320/045* (2013.01); *G09G 2330/08* (2013.01); *G09G 2330/12* (2013.01)

(58) Field of Classification Search
CPC ..... G09G 2320/0233; G09G 2320/045; G09G 2330/08; G09G 2330/12; G09G 3/2003; G09G 3/3225; G09G 3/30; G09G 3/2074; H04M 1/0266
See application file for complete search history.

(56) References Cited

U.S. PATENT DOCUMENTS

| | | | | |
|---|---|---|---|---|
| 2013/0147858 A1* | 6/2013 | Omoto | G09G 3/30 | 345/76 |
| 2016/0019823 A1* | 1/2016 | Guo | G09G 3/3225 | 345/55 |
| 2016/0041434 A1* | 2/2016 | Qin | G09G 3/2074 | 345/694 |
| 2021/0335910 A1* | 10/2021 | Tan | H04M 1/0266 | |

FOREIGN PATENT DOCUMENTS

| | | | |
|---|---|---|---|
| CN | 102469275 | A | 5/2012 |
| CN | 102736341 | A | 10/2012 |
| CN | 104347029 | A | 2/2015 |
| CN | 106683618 | A | 5/2017 |
| CN | 107633810 | A | 1/2018 |
| CN | 111739911 | A | 10/2020 |
| CN | 112102777 | A | 12/2020 |
| CN | 112509514 | A | 3/2021 |
| KR | 20160141237 | A | 12/2016 |
| KR | 20170062575 | A | 6/2017 |
| KR | 20180014379 | A | 2/2018 |

* cited by examiner

COMPENSATION METHOD AND COMPENSATION DEVICE OF DISPLAY PANEL

CROSS-REFERENCE TO RELATED APPLICATION

This application is a national phase application under 35 U.S.C. § 371 of PCT Application No. PCT/CN2021/137086, filed Dec. 10, 2021, which claims priority to Chinese Application No. 202111404299.3, filed Nov. 24, 2021, the contents of which are incorporated herein by reference in their entirety.

FIELD OF THE INVENTION

The present application relates to a display technology field, and more particularly to a compensation method and a compensation device of a display panel.

BACKGROUND OF THE INVENTION

Unlike a liquid crystal display (LCD) that utilizes a stable voltage to control brightness, an organic light-emitting diode (OLED) uses a current drive and requires a stable current to control light emission. Generally, an OLED display outputs a current to the OLED through a drive transistor in a pixel driving circuit in each pixel to drive the OLED to emit light. Since the electrical characteristics of the drive transistors in the OLED display are inconsistent, there is a difference in brightness among the pixel units. In order to ensure the technical problem of brightness inconsistency caused by the inconsistency of the electrical characteristics of the drive transistors, the prior art proposes an external compensation method. By compensating the threshold voltage of the drive transistor corresponding to each sub-pixel, a corrected driving voltage is generated to ensure the consistency of the displayed content of the OLED display.

For reducing the circuit density, multiple sub-pixels with different light-emitting colors share a set of detection and compensation circuits. When a certain sub-pixel is defective due to the thin film transistor process or the organic light-emitting layer process, it will affect the detection of the threshold voltage of the surrounding sub-pixels sharing the detection circuit, resulting that the surrounding pixels will become a bright or dark dot after being detected and compensated by the module, thereby forming a bright-dark connection dot defect. It exceeds the customer's acceptance standard, it must be compensated again after laser repair, which is a waste of module repair and compensation capacity, and affects the module first pass yield.

Therefore, there is an urgent need for a compensation method and a compensation device of a display panel to solve the aforesaid technical problems.

SUMMARY OF THE INVENTION

The embodiment of the present application provides a compensation method and a compensation device of a display panel, which can improve the technical problem of forming bright-dark connection dot defects in the voltage detection and compensation stage of the current display panel.

The embodiment of the present application provides a compensation method of a display panel, comprising following steps:

acquiring position information of a first sub-pixel in a target display panel, wherein the first sub-pixel is a sub-pixel to be compensated;

acquiring position information of a second sub-pixel corresponding to the first sub-pixel when the position information of the first sub-pixel matches position information of an abnormal sub-pixel in a target display panel, wherein the second sub-pixel and the first sub-pixel are located in a same pixel unit;

acquiring position information of a third sub-pixel corresponding to the second sub-pixel according to the position information of the second sub-pixel, wherein the third sub-pixel and the second sub-pixel are arranged adjacent to each other and emit light of a same color;

setting a compensation parameter of the third sub-pixel as a compensation parameter of the second sub-pixel;

wherein the step of acquiring the position information of the abnormal sub-pixel in the target display panel comprises:

performing a lighting detection on the target display panel;

determining the position information of the abnormal sub-pixel corresponding to an abnormal display of the target display panel;

storing the position information of the abnormal sub-pixel in a compensation device.

In the compensation method of the display panel provided by the embodiment of the present application, the step of acquiring the position information of the first sub-pixel in the target display panel further comprises:

scanning the target display panel;

acquiring pixel coordinates of the first sub-pixel in the target display panel to acquire position information of the first sub-pixel in the target display panel.

In the compensation method of the display panel provided by the embodiment of the present application, when the position information of the first sub-pixel does not match the position information of the abnormal sub-pixel in the target display panel, a pixel voltage of the first sub-pixel is compensated.

In the compensation method of the display panel provided by the embodiment of the present application, the step of setting the compensation parameter of the third sub-pixel as the compensation parameter of the second sub-pixel comprises:

compensating a pixel voltage of the third sub-pixel by a pixel driving circuit to acquire the compensation parameter of the third sub-pixel;

setting the compensation parameter of the third sub-pixel as a compensation parameter of the second sub-pixel.

In the compensation method of the display panel provided by the embodiment of the present application, each of the pixel driving circuits corresponds to one of the sub-pixels, and the pixel driving circuit further comprises a sense thin film transistor;

wherein in the same pixel unit, the sense thin film transistor in the sub-pixel and the sense thin film transistor in another sub-pixel are both electrically connected to a same reference voltage signal.

In the compensation method of the display panel provided by the embodiment of the present application, the pixel driving circuit comprises a scan thin film transistor, a drive thin film transistor, the sense thin film transistor, an organic light emitting diode and a storage capacitor;

wherein a source of the scan thin film transistor is electrically connected to a data signal, a drain is electrically connected to a gate of the drive thin film transistor, and a gate is electrically connected to a scan signal;

a source of the drive thin film transistor is electrically connected to a constant voltage high potential signal, and a drain is electrically connected to a first electrode of the organic light emitting diode and a drain of the sense thin film transistor;

a source of the sense thin film transistor is electrically connected to the reference voltage signal, and a gate is electrically connected to a sense enable signal;

a second electrode of the organic light emitting diode is electrically connected to a constant voltage low potential signal;

a first plate of the storage capacitor is electrically connected to the drain of the scan thin film transistor and the gate of the drive thin film transistor, and a second plate is electrically connected to the drain of the drive thin film transistor and the first electrode of the organic light emitting diode.

In the compensation method of the display panel provided by the embodiment of the present application, after the step of setting the compensation parameter of the third sub-pixel as the compensation parameter of the second sub-pixel, the compensation method further comprises:

performing a laser repair on an area corresponding to the first sub-pixel, so that the first sub-pixel displays normally after being compensated by the pixel voltage.

Correspondingly, the embodiment of the present application further provides a compensation method of the display panel, comprising:

acquiring position information of a first sub-pixel in a target display panel, wherein the first sub-pixel is a sub-pixel to be compensated;

acquiring position information of a second sub-pixel corresponding to the first sub-pixel when the position information of the first sub-pixel matches position information of an abnormal sub-pixel in a target display panel, wherein the second sub-pixel and the first sub-pixel are located in a same pixel unit;

acquiring position information of a third sub-pixel corresponding to the second sub-pixel according to the position information of the second sub-pixel, wherein the third sub-pixel and the second sub-pixel are arranged adjacent to each other and emit light of a same color;

setting a compensation parameter of the third sub-pixel as a compensation parameter of the second sub-pixel.

In the compensation method of the display panel provided by the embodiment of the present application, the step of acquiring the position information of the first sub-pixel in the target display panel further comprises:

scanning the target display panel;

acquiring pixel coordinates of the first sub-pixel in the target display panel to acquire position information of the first sub-pixel in the target display panel.

In the compensation method of the display panel provided by the embodiment of the present application, when the position information of the first sub-pixel does not match the position information of the abnormal sub-pixel in the target display panel, a pixel voltage of the first sub-pixel is compensated.

In the compensation method of the display panel provided by the embodiment of the present application, the step of setting the compensation parameter of the third sub-pixel as the compensation parameter of the second sub-pixel comprises:

compensating a pixel voltage of the third sub-pixel by a pixel driving circuit to acquire the compensation parameter of the third sub-pixel;

setting the compensation parameter of the third sub-pixel as a compensation parameter of the second sub-pixel.

In the compensation method of the display panel provided by the embodiment of the present application, each of the pixel driving circuits corresponds to one of the sub-pixels, and the pixel driving circuit further comprises a sense thin film transistor;

wherein in the same pixel unit, the sense thin film transistor in the sub-pixel and the sense thin film transistor in another sub-pixel are both electrically connected to a same reference voltage signal.

In the compensation method of the display panel provided by the embodiment of the present application, the pixel driving circuit comprises a scan thin film transistor, a drive thin film transistor, the sense thin film transistor, an organic light emitting diode and a storage capacitor;

wherein a source of the scan thin film transistor is electrically connected to a data signal, a drain is electrically connected to a gate of the drive thin film transistor, and a gate is electrically connected to a scan signal;

a source of the drive thin film transistor is electrically connected to a constant voltage high potential signal, and a drain is electrically connected to a first electrode of the organic light emitting diode and a drain of the sense thin film transistor;

a source of the sense thin film transistor is electrically connected to the reference voltage signal, and a gate is electrically connected to a sense enable signal;

a second electrode of the organic light emitting diode is electrically connected to a constant voltage low potential signal;

a first plate of the storage capacitor is electrically connected to the drain of the scan thin film transistor and the gate of the drive thin film transistor, and a second plate is electrically connected to the drain of the drive thin film transistor and the first electrode of the organic light emitting diode.

In the compensation method of the display panel provided by the embodiment of the present application, after the step of setting the compensation parameter of the third sub-pixel as the compensation parameter of the second sub-pixel, the compensation method further comprises:

performing a laser repair on an area corresponding to the first sub-pixel, so that the first sub-pixel displays normally after being compensated by the pixel voltage.

Correspondingly, the embodiment of the present application further provides a compensation device applied to a display panel, wherein the display panel comprises a plurality of pixel units, each of the pixel units comprises a plurality of sub-pixels with different light-emitting colors, wherein the compensation device comprises following steps:

a first acquiring module acquiring position information of a target position in a target display panel, wherein the position information comprises a target position information of an abnormal display on the display panel;

a determining module determining whether position information of a first sub-pixel in the target display panel matches position information of an abnormal sub-pixel in the target display panel;

a second acquiring module acquiring position information of a second sub-pixel corresponding to the first sub-pixel and position information of a third sub-pixel corresponding to the second sub-pixel when the position information of the first sub-pixel matches the position information of the abnormal sub-pixel in the target display panel, wherein the second sub-pixel and the first sub-pixel are located in a same pixel unit, and the third sub-pixel and the second sub-pixel are arranged adjacent to each other and emit light of a same color; and a processing module setting a compensation parameter of the third sub-pixel as a compensation parameter of the second sub-pixel.

In the compensation device of the display panel provided by the embodiment of the present application, each of the sub-pixels comprises one pixel driving circuit, and the pixel driving circuit further comprises a sense thin film transistor;

wherein in the same pixel unit, the sense thin film transistor in the sub-pixel and the sense thin film transistor in another sub-pixel are both electrically connected to a same reference voltage signal.

In the compensation device of the display panel provided by the embodiment of the present application, the pixel driving circuit comprises a scan thin film transistor, a drive thin film transistor, the sense thin film transistor, an organic light emitting diode and a storage capacitor;

wherein a source of the scan thin film transistor is electrically connected to a data signal, a drain is electrically connected to a gate of the drive thin film transistor, and a gate is electrically connected to a scan signal;

a source of the drive thin film transistor is electrically connected to a constant voltage high potential signal, and a drain is electrically connected to a first electrode of the organic light emitting diode and a drain of the sense thin film transistor;

a source of the sense thin film transistor is electrically connected to the reference voltage signal, and a gate is electrically connected to a sense enable signal;

a second electrode of the organic light emitting diode is electrically connected to a constant voltage low potential signal;

a first plate of the storage capacitor is electrically connected to the drain of the scan thin film transistor and the gate of the drive thin film transistor, and a second plate is electrically connected to the drain of the drive thin film transistor and the first electrode of the organic light emitting diode.

In the compensation device of the display panel provided by the embodiment of the present application, the second acquiring module is further employed to acquire the compensation parameter of the first sub-pixel when the position information of the first sub-pixel does not match the position information of the abnormal sub-pixel in the target display panel.

In the compensation device of the display panel provided by the embodiment of the present application, the processing module is employed to compensate a pixel voltage of the third sub-pixel by the pixel driving circuit to acquire the compensation parameter of the third sub-pixel, and set the compensation parameter of the third sub-pixel as the compensation parameter of the second sub-pixel.

In the compensation device of the display panel provided by the embodiment of the present application, the processing module is further employed to perform a laser repair on an area corresponding to the first sub-pixel, so that the first sub-pixel displays normally after being compensated by the pixel voltage.

The embodiment of the present application provides a compensation method and a compensation device of a display panel; the compensation method comprises: first, acquiring position information of a first sub-pixel in a target display panel, wherein the first sub-pixel is a sub-pixel to be compensated; acquiring position information of a second sub-pixel corresponding to the first sub-pixel when the position information of the first sub-pixel matches position information of an abnormal sub-pixel in a target display panel, wherein the second sub-pixel and the first sub-pixel are located in a same pixel unit; then, acquiring position information of a third sub-pixel corresponding to the second sub-pixel according to the position information of the second sub-pixel, wherein the third sub-pixel and the second sub-pixel are arranged adjacent to each other and emit light of a same color; finally, setting a compensation parameter of the third sub-pixel as a compensation parameter of the second sub-pixel; The aforesaid compensation method of the display panel first determines whether the abnormal display of the sub-pixel to be compensated occurs. When the abnormal display of the sub-pixel to be compensated occurs, the compensation parameter of the second sub-pixel in the same pixel unit as the pixel to be compensated is set as the pixel voltage value of the third sub-pixel after compensation, wherein the third sub-pixel and the second sub-pixel are arranged adjacent to each other and emit light of the same color, thus to prevent the second sub-pixel from being compensated into a bright or dark dot due to defect in the pixel to be compensated, thereby optimizing the manufacturing process of the display module, and reducing the repair and compensation productivity of the display module. At the same time, it avoids unnecessary yield loss caused by display module repair failure.

DETAILED DESCRIPTION OF PREFERRED EMBODIMENTS

The embodiment of the present application is directed to the technical problem of forming bright-dark connection dot defects in the voltage detection and compensation stage of the current display panel. The embodiment of the present application can improve the above technical problems.

The embodiment of the present application provides a compensation method of a display panel. The compensation method comprises but is not limited to the following embodiments and a combination of the following embodiments.

Figure 1:
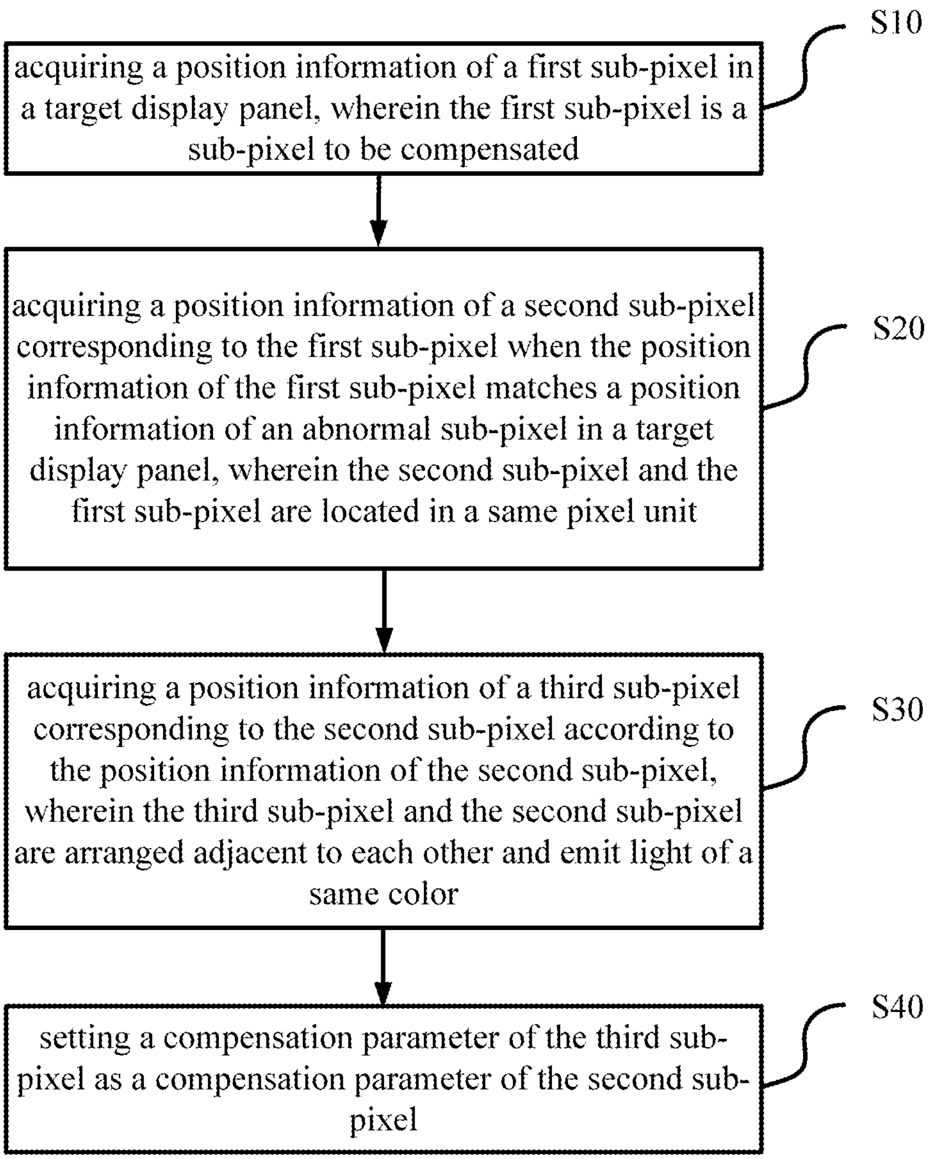
FIG. 1 is a flowchart of a compensation method for a display panel provided by an embodiment of the application.

In one embodiment, as shown in FIG. 1, which is a flowchart of the compensation method for the display panel provided by the embodiment of the present application; the compensation method of the display panel comprises but is not limited to the following steps.

S10, acquiring position information of a first sub-pixel in a target display panel, wherein the first sub-pixel is a sub-pixel to be compensated.

Specifically, S10 further comprises:

first, scanning the target display panel; then, acquiring pixel coordinates of the first sub-pixel in the target display panel to acquire position information of the first sub-pixel in the target display panel.

The target display panel comprises pixel units aligned in an array. Each pixel unit comprises a plurality of sub-pixels with different light-emitting colors, and each of the sub-pixels is correspondingly connected to a pixel driving circuit. The pixel driving circuit is employed to detect and compensate the threshold voltage of the corresponding sub-pixel, so as to ensure that the light-emitting brightness of each sub-pixel is the same.

Specifically, the pixel driving circuit further comprises a sense thin film transistor; in the same pixel unit, the sense thin film transistor in the sub-pixel and the sense thin film transistor in another sub-pixel are both electrically connected to a same reference voltage signal; this arrangement is to reduce the line density.

Furthermore, the pixel unit comprises a red sub-pixel, a green sub-pixel and a blue sub-pixel; or the pixel unit comprises a red sub-pixel, a green sub-pixel, a blue sub-pixel and a white sub-pixel.

S20, acquiring position information of a second sub-pixel corresponding to the first sub-pixel when the position information of the first sub-pixel matches position information of an abnormal sub-pixel in a target display panel, wherein the second sub-pixel and the first sub-pixel are located in a same pixel unit.

Specifically, S20 further comprises:

first, inputting a test signal to the target display panel to light up each of the sub-pixels; then, observing whether each pixel is good or not one by one through the defect detection device; When the defect detection device finds that a certain sub-pixel has an abnormal display, acquiring position information of the abnormal sub-pixel in the target display panel, and storing the position information of the abnormal sub-pixel in the compensation device. The abnormal display of the sub-pixel refers to that the sub-pixel displays a bright dot or a dark dot.

Then, the position information of the first sub-pixel is compared with the position information of the abnormal sub-pixel in the compensation device; when the position information of the first sub-pixel matches the position information of the abnormal sub-pixel in the target display panel, the first sub-pixel is determined to be an abnormal sub-pixel; then, position information of a second sub-pixel corresponding to the first sub-pixel is acquired, and the second sub-pixel and the first sub-pixel are located in the same pixel unit.

Furthermore, when the position information of the first sub-pixel does not match the position information of the abnormal sub-pixel in the target display panel, the first sub-pixel is determined to be a normal light-emitting sub-pixel; then, the pixel driving circuit corresponding to the first sub-pixel normally detects and compensates the threshold voltage of the drive thin film transistor in the first sub-pixel, so that the brightness of the first sub-pixel is the same as the brightness of other normally-emitting sub-pixels.

S30, acquiring position information of a third sub-pixel corresponding to the second sub-pixel according to the position information of the second sub-pixel, wherein the third sub-pixel and the second sub-pixel are arranged adjacent to each other and emit light of a same color.

Specifically, S30 further comprises:

directly acquiring position information of a third sub-pixel corresponding to the second sub-pixel according to the position information of the second sub-pixel, wherein the third sub-pixel and the second sub-pixel are arranged adjacent to each other and emit light of a same color;

S40, setting a compensation parameter of the third sub-pixel as a compensation parameter of the second sub-pixel.

Specifically, S40 further comprises:

first, the pixel driving circuit corresponding to the third sub-pixel normally detects and compensates the threshold voltage of the drive thin film transistor in the third sub-pixel to acquire the threshold voltage compensation value of the drive thin film transistor in the third sub-pixel, and this threshold voltage compensation value belongs to the third sub-pixel. Then, the compensation device directly sets a compensation parameter of the third sub-pixel as a compensation parameter of the second sub-pixel through a compensation algorithm.

Since the first sub-pixel is a sub-pixel possessing the abnormal display, and the second sub-pixel, which is in the same pixel unit as the first sub-pixel, shares the detection and compensation circuit with the first sub-pixel, the threshold voltage compensation value of the drive thin film transistor in the second sub-pixel will become larger or smaller, so that the second sub-pixel becomes brighter or darker; however, the threshold voltage compensation value of the drive thin film transistor in the third sub-pixel adjacent to the second sub-pixel with the same color remains unchanged, thus it is possible to prevent the second sub-pixel from having abnormal display due to the manufacturing process defect of the first sub-pixel, and avoid increasing the module repair and compensation productivity.

In some embodiments of the present application, after the step of setting the compensation parameter of the third sub-pixel as the compensation parameter of the second sub-pixel, the compensation method further comprises:

performing a laser repair on an area corresponding to the first sub-pixel, so that the first sub-pixel displays normally after being compensated by the pixel voltage.

Since the brightness value of the first sub-pixel after pixel voltage compensation is still inconsistent with the compensated brightness values of other sub-pixels, it is necessary to detect the area corresponding to the first sub-pixel, and perform laser repair on the defect after a defect is found; then, the threshold voltage of the drive thin film transistor corresponding to the first sub-pixel is compensated again, so that the compensated brightness value of the first sub-pixel is consistent with the compensated brightness values of other sub-pixels.

Regarding the technical problem of forming bright-dark connection dot defects in the voltage detection and compensation stage of the current display panel, the embodiment of the present application provides a compensation method of a display panel; the compensation method comprises: first, acquiring position information of a first sub-pixel in a target display panel, wherein the first sub-pixel is a sub-pixel to be compensated; acquiring position information of a second sub-pixel corresponding to the first sub-pixel when the position information of the first sub-pixel matches position information of an abnormal sub-pixel in a target display panel, wherein the second sub-pixel and the first sub-pixel are located in a same pixel unit; then, acquiring position information of a third sub-pixel corresponding to the second sub-pixel according to the position information of the second sub-pixel, wherein the third sub-pixel and the second sub-pixel are arranged adjacent to each other and emit light of a same color; finally, setting a compensation parameter of the third sub-pixel as a compensation parameter of the second sub-pixel; the aforesaid compensation method of the display panel first determines whether the abnormal display of the sub-pixel to be compensated occurs. When the abnormal display of the sub-pixel to be compensated occurs, the compensation parameter of the second sub-pixel in the same pixel unit as the pixel to be compensated is set as the pixel voltage value of the third sub-pixel after compensation, wherein the third sub-pixel and the second sub-pixel are arranged adjacent to each other and emit light of the same color, thus to prevent the second sub-pixel from being compensated into a bright or dark dot due to defect in the pixel to be compensated, thereby optimizing the manufacturing process of the display module, and reducing the repair and compensation productivity of the display module. At the same time, it avoids unnecessary yield loss caused by display module repair failure.

Figure 2:
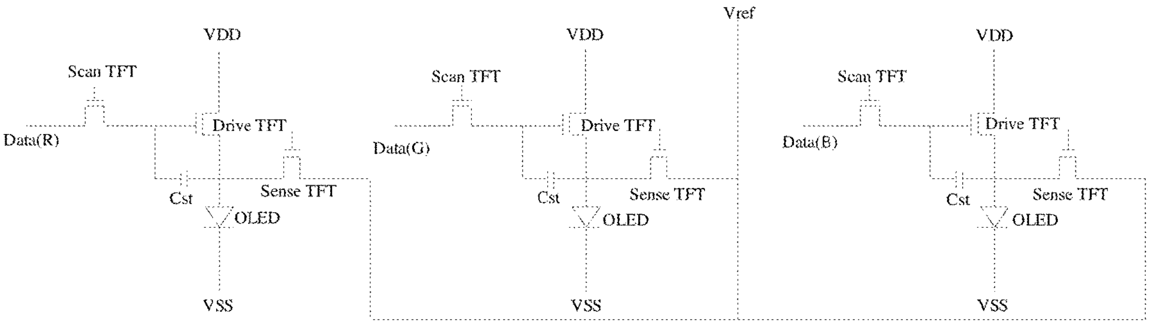
FIG. 2 is a diagram of a pixel driving circuit of a display panel provided by an embodiment of the application.

As shown in FIG. 2, which is a diagram of a pixel driving circuit of a display panel provided by an embodiment of the application; wherein each of the sub-pixel corresponds to one of the pixel driving circuits, and in the same pixel unit, the sense thin film transistor in the sub-pixel and the sense thin film transistor in another sub-pixel are both electrically connected to a same reference voltage signal (Vref).

Specifically, the pixel driving circuit comprises a scan thin film transistor (Scan TFT), a drive thin film transistor (Drive TFT), the sense thin film transistor (Sense TFT), an organic light emitting diode (OLED) and a storage capacitor (Cst);

- wherein the source of the scan thin film transistor (Scan TFT) is electrically connected to any one of the red sub-pixel data signal Data (R), the green sub-pixel data signal Data (G) and the blue sub-pixel data signal Data (B), and the drain is electrically connected to the gate of the drive thin film transistor (Drive TFT), and the gate is electrically connected to the scan signal;
- the source of the drive thin film transistor (Drive TFT) is electrically connected to a constant voltage high potential signal (VDD), and the drain is electrically connected to the first electrode of the organic light emitting diode (OLED) and the drain of the sense thin film transistor (Sense TFT);
- the source of the sense thin film transistor (Sense TFT) is electrically connected to the reference voltage signal (Vref), and the gate is electrically connected to the sense enable signal;
- the second electrode of the organic light emitting diode (OLED) is electrically connected to a constant voltage low potential signal (VSS);
- the first plate of the storage capacitor (Cst) is electrically connected to the drain of the scan thin film transistor (Scan TFT) and the gate of the drive thin film transistor (Drive TFT), and a second plate is electrically connected to the drain of the drive thin film transistor (Drive TFT) and the first electrode of the organic light emitting diode (VDD).

In the embodiment of the present application, if the gate and drain of the drive thin film transistor (Drive TFT) of a certain sub-pixel are short-circuited, the threshold voltage detected by the drive thin film transistor (Drive TFT) of the other sub-pixels in the same pixel unit will be higher.

In the embodiment of the present application, if the gate and source of the drive thin film transistor (Drive TFT) in the pixel drive circuit corresponding to a certain sub-pixel are short-circuited and the upper and lower plates of the storage capacitor (Cst) are short-circuited, the threshold voltage detected by the drive thin film transistor (Drive TFT) of the other sub-pixels in the same pixel unit will be lower.

In the embodiment of the present application, if the first electrode and the second electrode of the organic light emitting diode (OLED) in the pixel driving circuit corresponding to a certain sub-pixel are short-circuited, the threshold voltage detected by the drive thin film transistor (Drive TFT) of the other sub-pixels in the same pixel unit will be lower.

Figure 3:
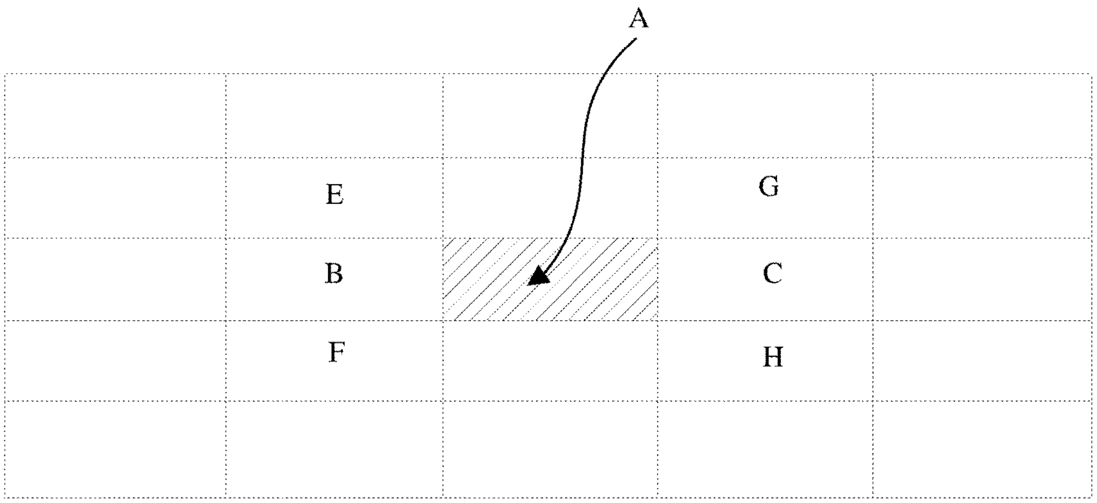
FIG. 3 is a diagram of pixel distribution in a display panel provided by an embodiment of the application.

As shown in FIG. 3, which is a diagram of pixel distribution in a display panel provided by an embodiment of the application; wherein the pixel unit comprises a sub-pixel A, a sub-pixel B and a sub-pixel C, and the light-emitting colors of the sub-pixel A, the sub-pixel B and the sub-pixel C are all different; the sub-pixel E and the sub-pixel F are adjacent to the sub-pixel B and have the same light-emitting color, and the sub-pixel G and the sub-pixel H are adjacent to the sub-pixel C and have the same light-emitting color.

Specifically, when the sub-pixel A is turned on as a dark dot, since the sub-pixel A, the sub-pixel B and the sub-pixel C share the detection and compensation circuit, the defect of the sub-pixel A causes the threshold voltage value of the drive thin film transistor in the sub-pixel B or the sub-pixel C detected by the pixel driving circuit to be higher or lower, so that the sub-pixel B or the sub-pixel C may become a bright dot or a dark dot after the module threshold voltage is compensated, thus increasing module repair and compensation capacity and increasing unnecessary yield loss caused by module repair failure. At this time, the sub-pixel B may borrow the compensation parameter of the sub-pixel E or the sub-pixel F, and the sub-pixel C may borrow the compensation parameter of the sub-pixel G or the sub-pixel H to avoid such kind of influence.

Figure 4:
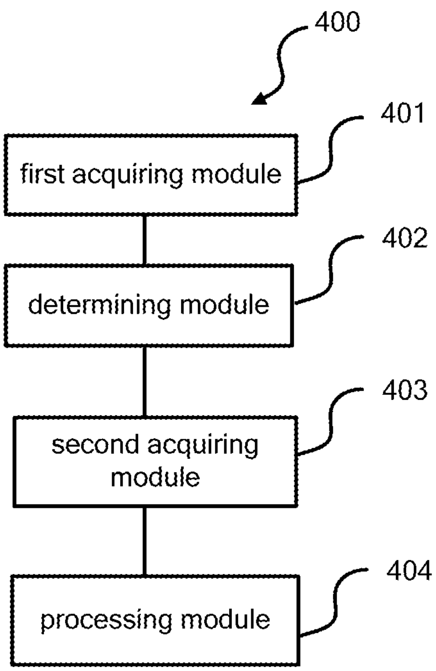
FIG. 4 is a structural block diagram of a compensation device according to an embodiment of the application.

Correspondingly, as shown in FIG. 4, which is a structural block diagram of a compensation device according to an embodiment of the application, the embodiment of the present application further provides a compensation device 400 applied to a display panel, wherein the display panel comprises a plurality of pixel units, each of the pixel units comprises a plurality of sub-pixels with different light-emitting colors, wherein the compensation device comprises:

- a first acquiring module 401, acquiring position information of a target position in a target display panel, wherein the position information comprises a target position information of an abnormal display on the display panel;
- a determining module 402, determining whether position information of a first sub-pixel in the target display panel matches position information of an abnormal sub-pixel in the target display panel;
- a second acquiring module 403, acquiring position information of a second sub-pixel corresponding to the first sub-pixel and position information of a third sub-pixel corresponding to the second sub-pixel when the position information of the first sub-pixel matches the position information of the abnormal sub-pixel in the target display panel; wherein the second sub-pixel and the first sub-pixel are located in a same pixel unit, and the third sub-pixel and the second sub-pixel are arranged adjacent to each other and emit light of a same color; and
- a processing module 404, setting a compensation parameter of the third sub-pixel as a compensation parameter of the second sub-pixel.

The first acquiring module 401 is further employed to scan the target display panel for acquiring pixel coordinates of the first sub-pixel in the target display panel to acquire position information of the first sub-pixel in the target display panel.

In the embodiment of the present application, the second acquiring module 402 is further employed to perform a lighting detection on the target display panel; determining the position information of the abnormal sub-pixel corresponding to an abnormal display of the target display panel; storing the position information of the abnormal sub-pixel in a compensation device.

In the embodiment of the present application, when the position information of the first sub-pixel does not match the position information of the abnormal sub-pixel in the target display panel, a pixel voltage of the first sub-pixel is compensated.

In the embodiment of the present application, the processing module 404 is employed to compensate a pixel voltage of the third sub-pixel by a pixel driving circuit to acquire the compensation parameter of the third sub-pixel; then, to set a compensation parameter of the third sub-pixel as a compensation parameter of the second sub-pixel.

In the embodiment of the present application, each of the pixel driving circuits corresponds to one of the sub-pixels, and the pixel driving circuit further comprises a sense thin film transistor;

wherein in the same pixel unit, the sense thin film transistor in the sub-pixel and the sense thin film transistor in another sub-pixel are both electrically connected to a same reference voltage signal.

The embodiment of the present application provides a compensation method and a compensation device of a display panel; the compensation method comprises: first, acquiring position information of a first sub-pixel in a target display panel, wherein the first sub-pixel is a sub-pixel to be compensated; acquiring position information of a second sub-pixel corresponding to the first sub-pixel when the position information of the first sub-pixel matches position information of an abnormal sub-pixel in a target display panel, wherein the second sub-pixel and the first sub-pixel are located in a same pixel unit; then, acquiring position information of a third sub-pixel corresponding to the second sub-pixel according to the position information of the second sub-pixel, wherein the third sub-pixel and the second sub-pixel are arranged adjacent to each other and emit light of a same color; finally, setting a compensation parameter of the third sub-pixel as a compensation parameter of the second sub-pixel; the aforesaid compensation method of the display panel first determines whether the abnormal display of the sub-pixel to be compensated occurs. When the abnormal display of the sub-pixel to be compensated occurs, the compensation parameter of the second sub-pixel in the same pixel unit as the pixel to be compensated is set as the pixel voltage value of the third sub-pixel after compensation, wherein the third sub-pixel and the second sub-pixel are arranged adjacent to each other and emit light of the same color, thus to prevent the second sub-pixel from being compensated into a bright or dark dot due to defect in the pixel to be compensated, thereby optimizing the manufacturing process of the display module, and reducing the repair and compensation productivity of the display module. At the same time, it avoids unnecessary yield loss caused by display module repair failure.

In the above-mentioned embodiments, the description of each embodiment possesses its own emphasis. For parts that are not described in detail in an embodiment, reference may be made to related descriptions of other embodiments.

The display panel 100 and the mobile terminal provided by the embodiments of the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. A compensation method of a display panel, comprising following steps:

acquiring position information of a first sub-pixel in a target display panel, wherein the first sub-pixel is a sub-pixel to be compensated;

acquiring position information of a second sub-pixel corresponding to the first sub-pixel when the position information of the first sub-pixel matches position information of an abnormal sub-pixel in a target display panel, wherein the second sub-pixel and the first sub-pixel are located in a same pixel unit;

acquiring position information of a third sub-pixel corresponding to the second sub-pixel according to the position information of the second sub-pixel, wherein the third sub-pixel and the second sub-pixel are arranged adjacent to each other and emit light of a same color;

setting a compensation parameter of the third sub-pixel as a compensation parameter of the second sub-pixel;

wherein the step of acquiring the position information of the abnormal sub-pixel in the target display panel comprises:

performing a lighting detection on the target display panel;

determining the position information of the abnormal sub-pixel corresponding to an abnormal display of the target display panel;

storing the position information of the abnormal sub-pixel in a compensation device.

2. The compensation method of the display panel according to claim 1, wherein the step of acquiring the position information of the first sub-pixel in the target display panel further comprises:

scanning the target display panel;

acquiring pixel coordinates of the first sub-pixel in the target display panel to acquire position information of the first sub-pixel in the target display panel.

3. The compensation method of the display panel according to claim 1, wherein when the position information of the first sub-pixel does not match the position information of the abnormal sub-pixel in the target display panel, a pixel voltage of the first sub-pixel is compensated.

4. The compensation method of the display panel according to claim 1, wherein the step of setting the compensation parameter of the third sub-pixel as the compensation parameter of the second sub-pixel comprises:

compensating a pixel voltage of the third sub-pixel by a pixel driving circuit to acquire the compensation parameter of the third sub-pixel;

setting the compensation parameter of the third sub-pixel as a compensation parameter of the second sub-pixel.

5. The compensation method of the display panel according to claim 4, wherein each of the pixel driving circuits corresponds to one of the sub-pixels, and the pixel driving circuit further comprises a sense thin film transistor;

wherein in the same pixel unit, the sense thin film transistor in the sub-pixel and the sense thin film transistor in another sub-pixel are both electrically connected to a same reference voltage signal.

6. The compensation method of the display panel according to claim 5, wherein the pixel driving circuit comprises a scan thin film transistor, a drive thin film transistor, the sense thin film transistor, an organic light emitting diode and a storage capacitor;

wherein a source of the scan thin film transistor is electrically connected to a data signal, a drain is electrically connected to a gate of the drive thin film transistor, and a gate is electrically connected to a scan signal;

a source of the drive thin film transistor is electrically connected to a constant voltage high potential signal, and a drain is electrically connected to a first electrode of the organic light emitting diode and a drain of the sense thin film transistor;

a source of the sense thin film transistor is electrically connected to the reference voltage signal, and a gate is electrically connected to a sense enable signal;

a second electrode of the organic light emitting diode is electrically connected to a constant voltage low potential signal;

a first plate of the storage capacitor is electrically connected to the drain of the scan thin film transistor and the gate of the drive thin film transistor, and a second plate is electrically connected to the drain of the drive thin film transistor and the first electrode of the organic light emitting diode.

7. The compensation method of the display panel according to claim 1, wherein after the step of setting the compensation parameter of the third sub-pixel as the compensation parameter of the second sub-pixel, the compensation method further comprises:

performing a laser repair on an area corresponding to the first sub-pixel, so that the first sub-pixel displays normally after being compensated by the pixel voltage.

8. A compensation method of a display panel, comprising following steps:

acquiring position information of a first sub-pixel in a target display panel, wherein the first sub-pixel is a sub-pixel to be compensated;

acquiring position information of a second sub-pixel corresponding to the first sub-pixel when the position information of the first sub-pixel matches position information of an abnormal sub-pixel in a target display panel, wherein the second sub-pixel and the first sub-pixel are located in a same pixel unit;

acquiring position information of a third sub-pixel corresponding to the second sub-pixel according to the position information of the second sub-pixel, wherein the third sub-pixel and the second sub-pixel are arranged adjacent to each other and emit light of a same color;

setting a compensation parameter of the third sub-pixel as a compensation parameter of the second sub-pixel.

9. The compensation method of the display panel according to claim 8, wherein the step of acquiring the position information of the first sub-pixel in the target display panel further comprises:

scanning the target display panel;

acquiring pixel coordinates of the first sub-pixel in the target display panel to acquire position information of the first sub-pixel in the target display panel.

10. The compensation method of the display panel according to claim 8, wherein when the position information of the first sub-pixel does not match the position information of the abnormal sub-pixel in the target display panel, a pixel voltage of the first sub-pixel is compensated.

11. The compensation method of the display panel according to claim 8, wherein the step of setting the compensation parameter of the third sub-pixel as the compensation parameter of the second sub-pixel comprises:

compensating a pixel voltage of the third sub-pixel by a pixel driving circuit to acquire the compensation parameter of the third sub-pixel;

setting the compensation parameter of the third sub-pixel as a compensation parameter of the second sub-pixel.

12. The compensation method of the display panel according to claim 11, wherein each of the pixel driving circuits corresponds to one of the sub-pixels, and the pixel driving circuit further comprises a sense thin film transistor;

wherein in the same pixel unit, the sense thin film transistor in the sub-pixel and the sense thin film transistor in another sub-pixel are both electrically connected to a same reference voltage signal.

13. The compensation method of the display panel according to claim 12, wherein the pixel driving circuit comprises a scan thin film transistor, a drive thin film transistor, the sense thin film transistor, an organic light emitting diode and a storage capacitor;

wherein a source of the scan thin film transistor is electrically connected to a data signal, a drain is electrically connected to a gate of the drive thin film transistor, and a gate is electrically connected to a scan signal;

a source of the drive thin film transistor is electrically connected to a constant voltage high potential signal, and a drain is electrically connected to a first electrode of the organic light emitting diode and a drain of the sense thin film transistor;

a source of the sense thin film transistor is electrically connected to the reference voltage signal, and a gate is electrically connected to a sense enable signal;

a second electrode of the organic light emitting diode is electrically connected to a constant voltage low potential signal;

a first plate of the storage capacitor is electrically connected to the drain of the scan thin film transistor and the gate of the drive thin film transistor, and a second plate is electrically connected to the drain of the drive thin film transistor and the first electrode of the organic light emitting diode.

14. The compensation method of the display panel according to claim 8, wherein after the step of setting the compensation parameter of the third sub-pixel as the compensation parameter of the second sub-pixel, the compensation method further comprises:

performing a laser repair on an area corresponding to the first sub-pixel, so that the first sub-pixel displays normally after being compensated by the pixel voltage.

15. A compensation device applied to a display panel, wherein the display panel comprises a plurality of pixel units, each of the pixel units comprises a plurality of sub-pixels with different light-emitting colors, wherein the compensation device comprises:

a first acquiring module acquiring position information of a target position in a target display panel, wherein the position information comprises a target position information of an abnormal display on the display panel;

a determining module determining whether position information of a first sub-pixel in the target display panel matches position information of an abnormal sub-pixel in the target display panel;

a second acquiring module acquiring position information of a second sub-pixel corresponding to the first sub-pixel and position information of a third sub-pixel corresponding to the second sub-pixel when the position information of the first sub-pixel matches the position information of the abnormal sub-pixel in the target display panel; wherein the second sub-pixel and the first sub-pixel are located in a same pixel unit, and the third sub-pixel and the second sub-pixel are arranged adjacent to each other and emit light of a same color; and a processing module, setting a compensation parameter of the third sub-pixel as a compensation parameter of the second sub-pixel.

16. The compensation device according to claim 15, wherein each of the sub-pixels comprises one pixel driving circuit, and the pixel driving circuit further comprises a sense thin film transistor;

wherein in the same pixel unit, the sense thin film transistor in the sub-pixel and the sense thin film transistor in another sub-pixel are both electrically connected to a same reference voltage signal.

17. The compensation device according to claim 16, wherein the pixel driving circuit comprises a scan thin film transistor, a drive thin film transistor, the sense thin film transistor, an organic light emitting diode and a storage capacitor;

wherein a source of the scan thin film transistor is electrically connected to a data signal, a drain is electrically connected to a gate of the drive thin film transistor, and a gate is electrically connected to a scan signal;

a source of the drive thin film transistor is electrically connected to a constant voltage high potential signal, and a drain is electrically connected to a first electrode of the organic light emitting diode and a drain of the sense thin film transistor;

a source of the sense thin film transistor is electrically connected to the reference voltage signal, and a gate is electrically connected to a sense enable signal;

a second electrode of the organic light emitting diode is electrically connected to a constant voltage low potential signal;

a first plate of the storage capacitor is electrically connected to the drain of the scan thin film transistor and the gate of the drive thin film transistor, and a second plate is electrically connected to the drain of the drive thin film transistor and the first electrode of the organic light emitting diode.

18. The compensation device according to claim 15, wherein the second acquiring module is further employed to acquire the compensation parameter of the first sub-pixel when the position information of the first sub-pixel does not match the position information of the abnormal sub-pixel in the target display panel.

19. The compensation device according to claim 15, wherein the processing module is employed to compensate a pixel voltage of the third sub-pixel by the pixel driving circuit to acquire the compensation parameter of the third sub-pixel, and set the compensation parameter of the third sub-pixel as the compensation parameter of the second sub-pixel.

20. The compensation device according to claim 19, wherein the processing module is further employed to perform a laser repair on an area corresponding to the first sub-pixel, so that the first sub-pixel displays normally after being compensated by the pixel voltage.

* * * * *